C. H. BAILEY.
VEHICLE WHEEL.
APPLICATION FILED APR. 18, 1910.
973,249.
Patented Oct. 18, 1910.
2 SHEETS—SHEET 1.
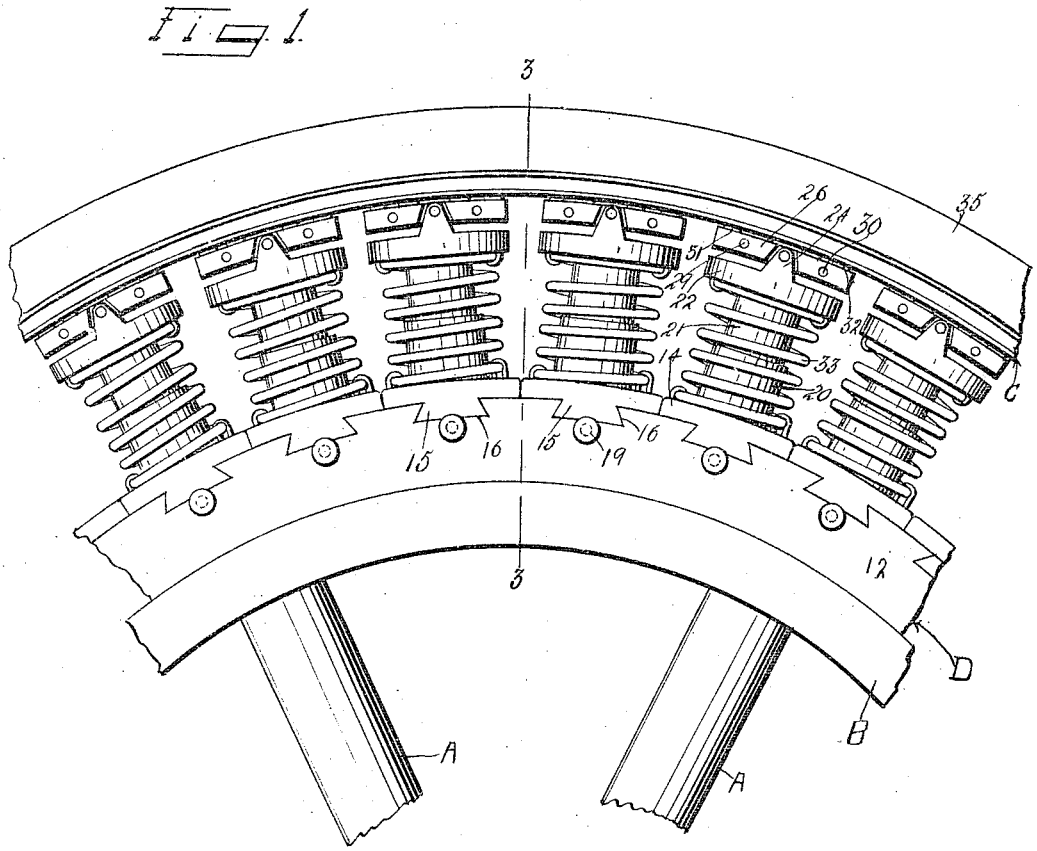
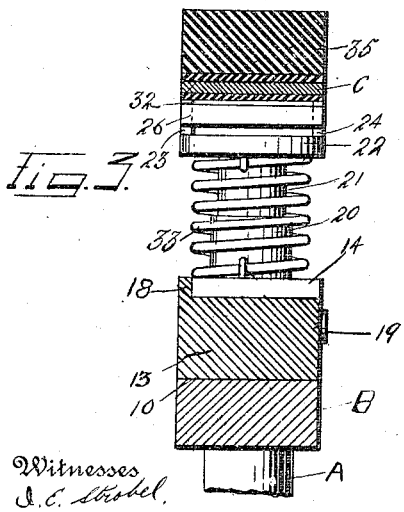
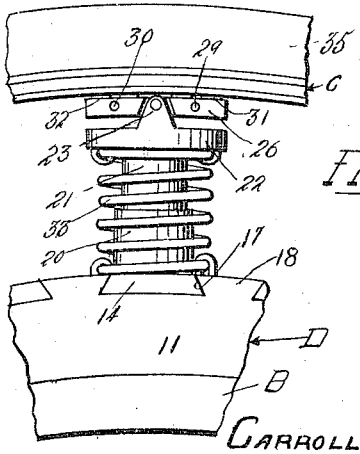
Witnesses
Inventor
CARROLL H. BAILEY.
By
Attorneys C. H. BAILEY.
VEHICLE WHEEL.
APPLICATION FILED APR. 18, 1910.
973,249.
Patented Oct. 18, 1910.
2 SHEETS—SHEET 2.
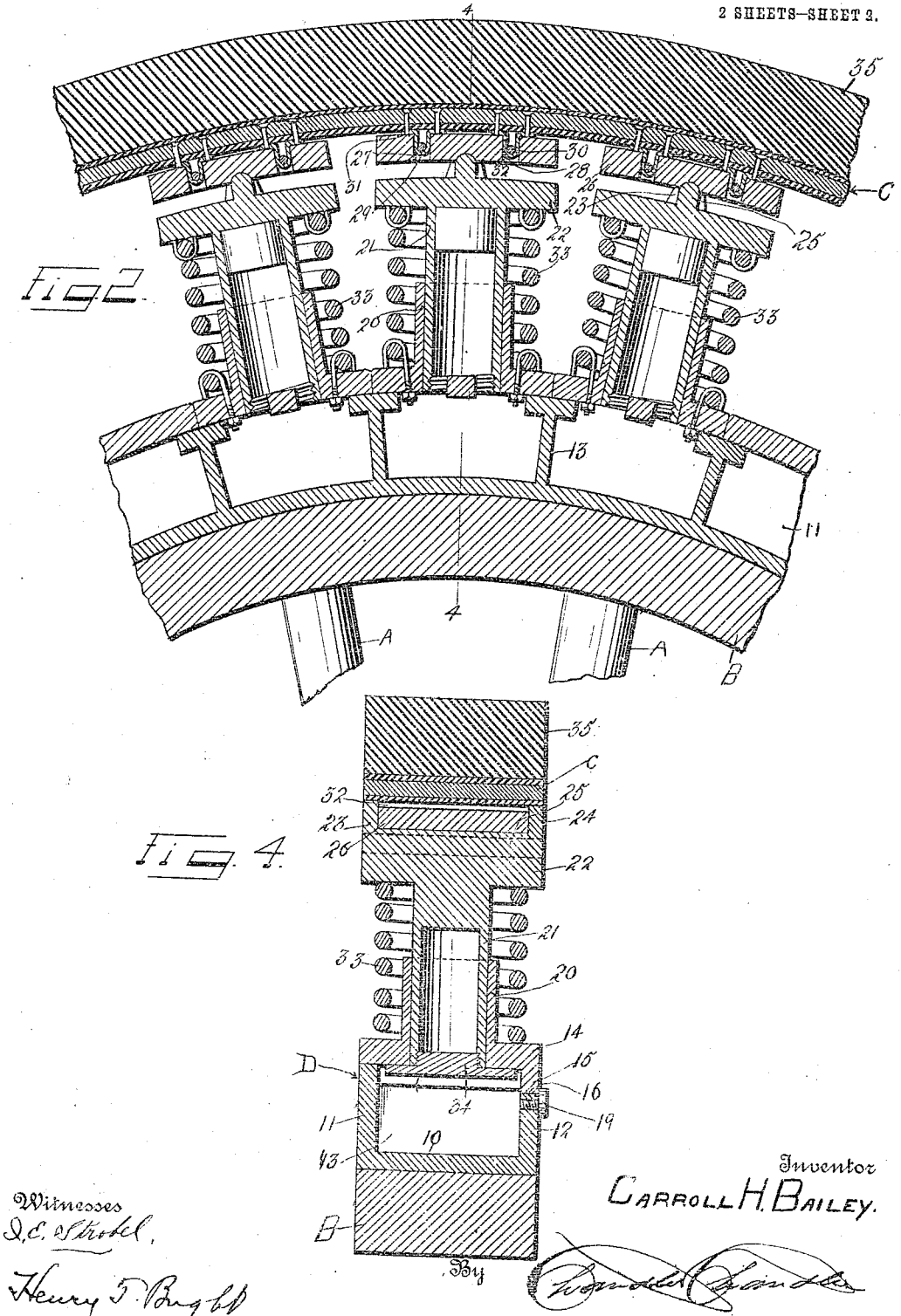
Witnesses
I. C. Strobl,
Henry F. Bright
Inventor
CARROLL H. BAILEY.
By
Attorneys

UNITED STATES PATENT OFFICE.

CARROLL H. BAILEY, OF NORTH TROY, NEW YORK.

VEHICLE-WHEEL.

973,249.  Specification of Letters Patent.  Patented Oct. 18, 1910.

Application filed April 18, 1910. Serial No. 556,211.

*To all whom it may concern:*

Be it known that I, CARROLL H. BAILEY, a citizen of the United States, residing at North Troy, in the county of Rensselaer, State of New York, have invented certain new and useful Improvements in Vehicle-Wheels; and I do hereby declare the following to be a full, clear, and exact description of the invention, such as will enable others skilled in the art to which it appertains to make and use the same.

This invention relates to vehicle wheels, and particularly to that type which is provided with a flexible rim or a tire.

The object of the invention resides in the construction of a wheel of the character named, which through the instrumentality of certain novel construction will reduce the jar and wear on a vehicle to a minimum.

A further object of the invention is the construction of a vehicle wheel possessing the advantages previously mentioned and which will be simple in construction, durable and efficient in use and comparatively inexpensive to manufacture.

With the above and other objects in view the invention consists in the details of construction, arrangement and combination of parts as will be hereinafter more fully described and particularly pointed out in the appended claim.

In describing the invention in detail reference will be had to the accompanying drawings wherein like characters of reference denote corresponding parts in the several views; and in which;

Figure 1 is a side elevation of a fragment of a wheel constructed in accordance with the invention; Fig. 2, a vertical longitudinal section of a fragment of the wheel on an enlarged scale; Fig. 3, a section on the line 3—3 of Fig. 1; Fig. 4, a section on the line 4—4 of Fig. 2; and, Fig. 5, a side elevation of a fragment of the wheel viewed oppositely from Fig. 1.

Referring to the drawing, the invention is shown as comprising spokes A which are connected to a hub (not shown), a felly B and a tire C disposed in spaced relation to the felly. An inner rim D is mounted around the felly B and is formed of a base member 10 and side members 11 and 12 rising from said base member. Cross plates 13 rest upon the base member 10 and connect the side members 11 and 12, said base, side members and cross plates being cast integral. Resting upon the outer edges of the side members 11 and 12, between each adjacent pair of cross plates 13 is a centrally perforated plate 14 having formed on one side thereof a depending dove-tailed projection 15 adapted to enter a dove-tailed recess 16 in the side member 12. The other side of said plate 14 is cut away at each end as at 17 to receive projections 18 formed on the side member 11. The connection between the plate 14 and the side members 11 and 12 just described serves to prevent the radial disengagement of the plate from the inner rim, while a bolt 19 mounted in the side member 12 serves to prevent lateral disengagement of said plate from the inner rim.

Rising centrally from the plate 14 is a tubular member 20 and telescoping in said member 20 is another tubular member 21, said member 21 terminating at its upper end in a laterally extending circular plate 22. Projecting upwardly from diametrically opposite points on the plate 22 are ears 23 and 24. Disposed between said ears is a rib 25 upon which is disposed for a rocking movement a plate 26 pivotally connected at opposite sides to the ears 23 and 24. Said plate 26 is provided on opposite sides of its transverse diameter with slots 27 and 28 within which are mounted the rods 29 and 30 respectively. Suitable clips 31 and 32 are passed around the rods 29 and 30 respectively and have their ends secured to the tire C, whereby a pivotal connection between the plate 22 and said tire is had.

A spring 33 encircles the members 20 and 21 and has its ends bearing against the inner faces of the plates 14 and 22 respectively; said spring, as will be obvious constantly tending to force the plates 14 and 22 away from each other.

The tubular member 21 has mounted in its lower end a flanged screw 34 which is adapted to engage the plate 14 on its under face and thus limit the movement of the plate 22 under the influence of the spring 33.

The tire C is constructed of leather, rubber, canvas and steel vulcanized and riveted together and then provided with an exteriorly disposed thick rubber tire 35 vulcanized thereon.

What is claimed is:

In a wheel, spokes, a felly carried by said spokes, an inner rim mounted upon said felly, said inner rim comprising a base provided with parallel outwardly extending flanges, a tire disposed in spaced relation to the inner rim, a plurality of radially compressible resilient members disposed between the inner rim and the tire, each of said members having guides comprising telescoping inner and outer sections provided at their inner and outer ends respectively with enlarged heads, the heads of the inner sections being in interlocking engagement with the free edges of the flanges of the rim, a pair of spaced outwardly extending ears on the enlarged heads of the outer section, a plurality of plates carried by the tire disposed respectively between and pivotally connected to the ears of the enlarged head of the adjacent outer section, and a rib on each enlarged head between the ears thereof upon which the adjacent plate carried by the tire rocks.

In testimony whereof, I affix my signature, in presence of two witnesses.

CARROLL H. BAILEY.

Witnesses:
WILLIAM A. LONG,
JAMES SIM.